(12) United States Patent
Guo et al.

(10) Patent No.: US 12,118,539 B2
(45) Date of Patent: Oct. 15, 2024

(54) STANDARDISATION METHOD AND APPARATUS FOR ERRONEOUS TRANSACTIONS

(71) Applicant: CHINA UNIONPAY CO., LTD., Shanghai (CN)

(72) Inventors: Hongqiang Guo, Shanghai (CN); Wei Li, Shanghai (CN); Zhen Tang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 441 days.

(21) Appl. No.: 16/318,950

(22) PCT Filed: Oct. 24, 2017

(86) PCT No.: PCT/CN2017/107454
§ 371 (c)(1),
(2) Date: Jan. 18, 2019

(87) PCT Pub. No.: WO2018/099209
PCT Pub. Date: Jun. 7, 2018

(65) Prior Publication Data
US 2021/0019692 A1 Jan. 21, 2021

(30) Foreign Application Priority Data
Nov. 29, 2016 (CN) .......................... 201611076397.8

(51) Int. Cl.
*G06Q 20/38* (2012.01)
*G06Q 10/08* (2023.01)
*G06Q 20/00* (2012.01)

(52) U.S. Cl.
CPC .......... *G06Q 20/382* (2013.01); *G06Q 10/08* (2013.01); *G06Q 20/00* (2013.01); *G06Q 20/38* (2013.01); *G06Q 20/3821* (2013.01)

(58) Field of Classification Search
CPC ...... G06Q 20/382; G06Q 10/08; G06Q 20/00; G06Q 220/38; G06Q 20/3821; G06Q 30/02
See application file for complete search history.

(56) References Cited

U.S. PATENT DOCUMENTS 5,557,798 A * 9/1996 Skeen ..................... G06F 9/542
709/215
5,644,778 A * 7/1997 Burks .................... G06Q 40/02
235/375

(Continued)

FOREIGN PATENT DOCUMENTS

CN 1681260 A 10/2005
CN 101211345 A 7/2008

(Continued)

OTHER PUBLICATIONS

International Search Report for corresponding International App. No. PCT/CN2017/107454, mailed Jan. 29, 2018.

*Primary Examiner* — Rutao Wu
*Assistant Examiner* — Stephen S Swartz
(74) *Attorney, Agent, or Firm* — ANOVA LAW GROUP, PLLC

(57) ABSTRACT

A standardisation method and apparatus for erroneous transactions: receiving an erroneous service invocation request sent by a client terminal, and converting the erroneous service invocation request into a standard format exchange message; on the basis of a preset certificate database, encrypting sensitive data areas in the exchange message to generate encrypted message areas; signing key fields in the exchange message to generate signed message areas; and, by means of a two-way authenticated secure communication link, sending the exchange message comprising the encrypted message areas and the signed message areas to a UnionPay erroneous transaction network. The embodiments (Continued)

provide a unified interface for interfacing client terminals to access a UnionPay erroneous transaction network; each UnionPay member institution only needs to invoke the interface assembly provided in the embodiments of the present invention to be able to interface with the UnionPay erroneous transaction network, improving development efficiency and operating stability.

18 Claims, 4 Drawing Sheets

(56) References Cited

U.S. PATENT DOCUMENTS

| | | | |
|---|---|---|---|
| 6,023,684 A * | 2/2000 | Pearson | G06Q 40/06 705/42 |
| 7,289,964 B1 * | 10/2007 | Bowman-Amuah | G06F 9/5038 705/1.1 |
| 11,361,853 B2 * | 6/2022 | Stern | G06Q 10/10 |
| 2005/0119978 A1 * | 6/2005 | Ates | G06Q 20/04 705/67 |
| 2009/0154699 A1 | 6/2009 | Tserkovny | |
| 2009/0254572 A1 * | 10/2009 | Redlich | G06Q 10/06 |
| 2011/0078035 A1 * | 3/2011 | Barton | G06Q 30/0601 705/26.1 |
| 2011/0289161 A1 * | 11/2011 | Rankin, Jr. | H04L 51/216 709/206 |
| 2012/0054842 A1 * | 3/2012 | Urios Rodriguez | G06Q 20/40 726/6 |
| 2012/0204032 A1 * | 8/2012 | Wilkins | H04L 63/0428 713/170 |
| 2013/0041888 A1 * | 2/2013 | Eisner | H04L 67/2823 707/E17.014 |
| 2013/0336209 A1 * | 12/2013 | Gage | H04W 8/26 370/328 |
| 2014/0162598 A1 * | 6/2014 | Villa-Real | G06Q 20/3227 455/411 |
| 2014/0164252 A1 * | 6/2014 | Chai | G06F 21/83 705/67 |
| 2015/0302398 A1 * | 10/2015 | Desai | G06Q 20/322 705/41 |
| 2016/0012465 A1 * | 1/2016 | Sharp | G06Q 20/321 705/14.17 |
| 2019/0097794 A1 * | 3/2019 | Nix | H04L 9/0662 |

FOREIGN PATENT DOCUMENTS

| | | |
|---|---|---|
| CN | 201570063 U | 9/2010 |
| CN | 105590215 A | 5/2016 |
| CN | 106603636 A | 4/2017 |
| TW | I522836 B | 2/2016 |

\* cited by examiner

STANDARDISATION METHOD AND APPARATUS FOR ERRONEOUS TRANSACTIONS

This application is a National Stage of International Application No. PCT/CN2017/107454, filed Oct. 24, 2017, which claims priority to Chinese Patent Application No. 201611076397.8, entitled "Standardisation Method and Apparatus for an Erroneous Transaction" filed on Nov. 29, 2016, both of which are incorporated herein by reference in their entireties.

TECHNICAL FIELD

The present invention relates to the field of the Internet, in particular to a standardisation method and apparatus for an erroneous transaction.

BACKGROUND

With the development of Internet technology, bank card payment ways are therefore diversified. The bank card payment process involves the participation of many parties, such as an acquirer, a bank card organization and a card issuer. Once inter-agency accounts are wrong due to abnormality in a payment process, all parties are required to verify the truth of the accounts by transmitting and auditing a large number of transaction information and credential files.

A UnionPay erroneous transaction network is a bank card erroneous service processing network of global UnionPay member institutions, i.e., a unified information exchange network for on-line processing of erroneous transactions by all member institutions, the core of the network is a UnionPay erroneous service system, and the member institutions access the network by building respective erroneous interfacing client terminals. Due to complex UnionPay erroneous service rules and technical specifications and high transaction network security standards, as well as limited technical levels of member institutions and different operating environments of client terminals, the problems of long development cycle, many testing problems, high operation error rate and the like at access ends of the institutions are caused, thereby greatly increasing the cost of the member institutions accessing the UnionPay erroneous transaction network and reducing the efficiency of the member institutions accessing the UnionPay erroneous transaction network.

In addition, the existing client systems built by member institutions for accessing a UnionPay erroneous interfacing network are all developed on the basis of implementation technologies, system environments and access requirements of the member institutions, which are highly dependent on the operating environments of the institutions, lack universal development interfaces, and are poor in operation stability, so the client systems can only be used by the developers to access the erroneous interfacing network and cannot be applied to other member institutions.

To sum up, there is an urgent need for a cross-platform standard component to unify the interfacing between the member institutions and the UnionPay erroneous transaction network.

SUMMARY

The present invention provides a standardisation method and apparatus for an erroneous transaction to solve the problems of lack of universal development interfaces between UnionPay member institutions and a UnionPay erroneous transaction network, poor operation stability and low development efficiency in the prior art.

In a first aspect, embodiments of the present invention provide a standardisation method for an erroneous transaction, including:
  receiving an erroneous service invocation request sent by a client terminal, and converting the erroneous service invocation request into an exchange message in a standard format;
  on the basis of a preset certificate database, encrypting a sensitive data area in the exchange message to generate an encrypted message area, and signing a key field in the exchange message to generate a signed message area; and
  sending the exchange message including the encrypted message area and the signed message area to a UnionPay erroneous transaction network through a two-way authenticated secure communication link.

Preferably, the exchange message in the standard format includes an Extensible Markup Language (XML) message tag name and an XML message tag value, and the converting the erroneous service invocation request into the exchange message in the standard format includes:
  converting an invocation method name of the erroneous service invocation request into the XML message tag name according to a preset corresponding relationship between the invocation method name and a message tag; and
  converting an invocation method parameter of the erroneous service invocation request into the XML message tag value.

Preferably, the preset certificate database is determined by:
  extracting a server public key and a client private key in an asymmetric encryption certificate of China Financial Certificate Authority (CFCA), and determining the preset certificate database by means of the server public key and the client private key, the asymmetric encryption certificate of the CFCA being used to access the UnionPay erroneous transaction network.

Preferably, the encrypting the sensitive data area in the exchange message to generate the encrypted message area, on the basis of a preset certificate database includes:
  invoking the server public key in the preset certificate database to encrypt the sensitive data area in the exchange message to generate the encrypted message area.

Preferably, the signing the key field in the exchange message to generate the signed message area includes:
  invoking the client private key in the preset certificate database to sign the key field in the exchange message to generate the signed message area.

Preferably, the two-way authenticated secure communication link is determined by:
  invoking the server public key and the client private key in the preset certificate database to establish the two-way authenticated secure communication link with the UnionPay erroneous transaction network according to Hyper Text Transfer Protocol over secure socket layer (HTTPS).

Preferably, before sending the exchange message including the encrypted message area and the signed message area to the UnionPay erroneous transaction network through the secure communication link, the method further includes:
  when the erroneous service invocation request includes a credential file in a binary encoding form, decoding the credential file; and encoding the decoded credential file by means of an encoding mode of the UnionPay erroneous transaction network.

In a second aspect, embodiments of the present invention provide a standardisation apparatus for erroneous transactions, including:
- a format converting unit, configured for receiving an erroneous service invocation request sent by a client terminal, and converting the erroneous service invocation request into an exchange message in a standard format;
- a message area converting unit, configured for, on the basis of a preset certificate database, encrypting a sensitive data area in the exchange message to generate an encrypted message area, and signing a key field in the exchange message to generate a signed message area; and
- a sending unit, configured for, sending the exchange message including the encrypted message area and the signed message area to a UnionPay erroneous transaction network through a two-way authenticated secure communication link.

Preferably, the exchange message in the standard format includes an Extensible Markup Language XML message tag name and an XML message tag value, and the format converting unit is specifically configured for:
- converting an invocation method name of the erroneous service invocation request into the XML message tag name according to a preset corresponding relationship between the invocation method name and a message tag; and
- converting an invocation method parameter of the erroneous service invocation request into the XML message tag value.

Preferably, the preset certificate database is determined by:
- extracting a server public key and a client private key in an asymmetric encryption certificate of China Financial Certificate Authority (CFCA), and determining the preset certificate database by means of the server public key and the client private key, the asymmetric encryption certificate of the CFCA being used to access the UnionPay erroneous transaction network.

Preferably, the message area converting unit is specifically configured for:
- invoking the server public key in the preset certificate database to encrypt the sensitive data area in the exchange message to generate the encrypted message area.

Preferably, the message area converting unit is specifically configured for:
- invoking the client private key in the preset certificate database to sign the key field in the exchange message to generate the signed message area.

Preferably, the two-way authenticated secure communication link is determined by:
- invoking the server public key and the client private key in the preset certificate database to establish the two-way authenticated secure communication link with the UnionPay erroneous transaction network according to Hyper Text Transfer Protocol over secure socket layer (HTTPS).

Preferably, the message area converting unit is further configured for:
- when the erroneous service invocation request includes a credential file in a binary encoding form, decoding the credential file; and encoding the decoded credential file by means of an encoding mode of the UnionPay erroneous transaction network.

In a third aspect, embodiments of the present invention provide an electronic device, including a processor, a memory, a transceiver and a bus interface. The processor, the memory and the transceiver are connected with one another through the bus interface.

The transceiver is configured for receiving an erroneous service invocation request sent by a client terminal.

The processor is configured for reading programs in the memory and executing the following method: converting the erroneous service invocation request into an exchange message in a standard format; on the basis of a preset certificate database, encrypting a sensitive data area in the exchange message to generate an encrypted message area, and signing a key field in the exchange message to generate a signed message area; and sending the exchange message including the encrypted message area and the signed message area to a UnionPay erroneous transaction network through a two-way authenticated secure communication link.

The memory is configured for storing one or more executable programs and data used by the processor during executing operations.

The transceiver is further configured for sending a risk level to a transaction platform to enable the transaction platform to determine whether to carry out payment according to the risk level.

The bus interface is configured for providing interfaces.

In a fourth aspect, embodiments of the present invention provide a non-transitory computer readable storage medium that stores computer instructions for enabling a computer to execute the standardisation method for an erroneous transaction described in any embodiment in the above first aspect.

In a fifth aspect, embodiments of the present invention provide a computer program product including computer programs stored in the non-transitory computer readable storage medium, and the computer programs include program instructions that, when executed by a computer, enable the computer to execute the standardisation method for an erroneous transaction described in any embodiment in the above first aspect.

The standardisation method and apparatus for an erroneous transaction provided by embodiments of the present invention include: receiving an erroneous service invocation request sent by a client terminal, and converting the erroneous service invocation request into an exchange message in a standard format; on the basis of a preset certificate database, encrypting a sensitive data area in the exchange message to generate an encrypted message area, and signing a key field in the exchange message to generate a signed message area; and sending the exchange message including the encrypted message area and the signed message area to a UnionPay erroneous transaction network through a two-way authenticated secure communication link. The embodiments of the present invention provide a unified interface for interfacing client terminals to access a UnionPay erroneous transaction network, and each UnionPay member institution only needs to invoke the interface assembly provided in the embodiments of the present invention to be able to interface with the UnionPay erroneous transaction network, improving development efficiency and operating stability.

BRIEF DESCRIPTION OF THE DRAWINGS

To describe technical schemes in embodiments of the present invention more clearly, the following briefly introduces the accompanying drawings required for describing the embodiments. Apparently, the accompanying drawings in the following description show only some embodiments of the present invention, and those of ordinary skill in the art may still derive other drawings from these accompanying drawings without creative efforts.

DETAILED DESCRIPTION

In order to make the objective, technical scheme and advantages of the present invention clearer, the present invention will be further described in detail below with reference to the accompanying drawings. Obviously, the described embodiments are only a part of the embodiments of the present invention, not all of them. All other embodiments obtained by those of ordinary skill in the art on the basis of the embodiments of the present invention without creative efforts shall fall within the protection scope of the present invention.

Figure 1:
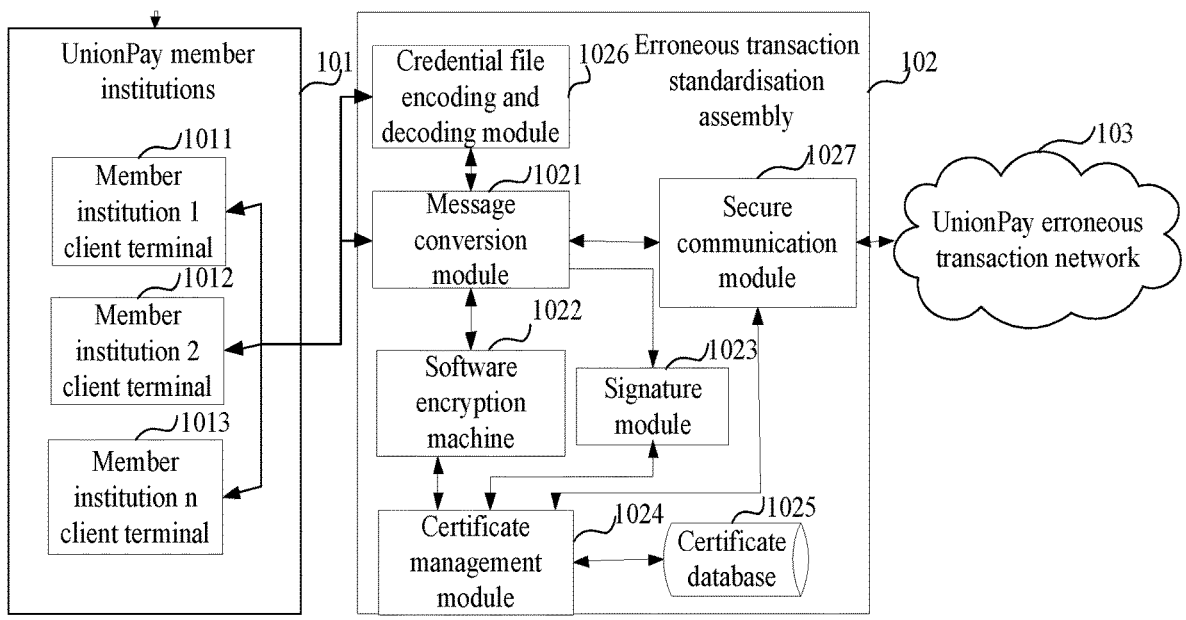
FIG. 1 is a structure diagram of a standardisation system for an erroneous transaction provided by an embodiment of the present invention.

An embodiment of the present invention provides a standardisation system for an erroneous transaction, as shown in FIG. 1 which is a structure diagram of the standardisation system for an erroneous transaction provided by the embodiment of the present invention. The standardisation system includes UnionPay member institutions 101, an erroneous transaction standardisation assembly 102 and a UnionPay erroneous transaction network 103. The UnionPay member institutions include: a member institution 1 client terminal 1011, a member institution 2 client terminal 1012, and a member institution n client terminal 1013, and the UnionPay member institutions 101 can realize interfacing with the UnionPay erroneous transaction network 103 by invoking the erroneous transaction standardisation assembly 102 provided by the embodiment of the present invention by means of respective client terminals.

The erroneous transaction standardisation assembly 102 provided by the embodiment of the present invention is realized through a Java universal interface technology and is suitable for various operating systems, such as Windows, Linux, and Unix, and for various middleware products, such as Websphere, Weblogic, Jboss, and Tomcat. In addition, the system environment such as institution code, user authority, and file path of each UnionPay member institution 101 is adapted by means of configuration parameters, so as to meet the requirements for the UnionPay member institutions 101 to access the UnionPay erroneous transaction network 103 under various technical conditions.

The erroneous transaction standardisation assembly 102 provided by the embodiment of the present invention includes a message conversion module 1021, a software encryption machine 1022, a signature module 1023, a certificate management module 1024, a certificate database 1025, a credential file encoding and decoding module 1026, and a secure communication module 1027.

The message conversion module 1021 is used for converting erroneous service data sent by client terminals of the UnionPay member institutions 101 into erroneous request messages in a standard format.

The software encryption machine 1022 is used for encrypting sensitive data areas in the erroneous request messages to ensure the confidentiality of the messages.

The signature module 1023 is used for signing key fields in the erroneous request messages to ensure the non-repudiation and tampering resistance of the messages.

The certificate management module 1024 is used for managing security authentication certificates of erroneous interfacing.

The certificate database 1025 stores asymmetric encryption certificates issued by CFCA (China Financial Certification Authority) to UnionPay, including server public keys and client private keys in a development stage, a network access test stage and a production and operation stage, for use by the certificate management module 1024.

The credential file encoding and decoding module 1026 is used for encoding and decoding erroneous credential files.

The secure communication module 1027 is used for establishing a two-way authenticated secure link with the UnionPay erroneous transaction network.

The embodiments of the present invention provide a unified interface for interfacing client terminals to access the UnionPay erroneous transaction network, and each UnionPay member institution 101 only needs to invoke the erroneous transaction standardisation assembly 102 provided in the embodiments of the present invention to be able to interface with the UnionPay erroneous transaction network 103. The UnionPay member institution 101 only needs to pay attention to the processing and implementation of erroneous services in its bank, greatly shortening the development cycles of the UnionPay member institutions 101, saving the development, testing, and operation and maintenance costs, and improving the development efficiency and operation stability.

Figure 2:
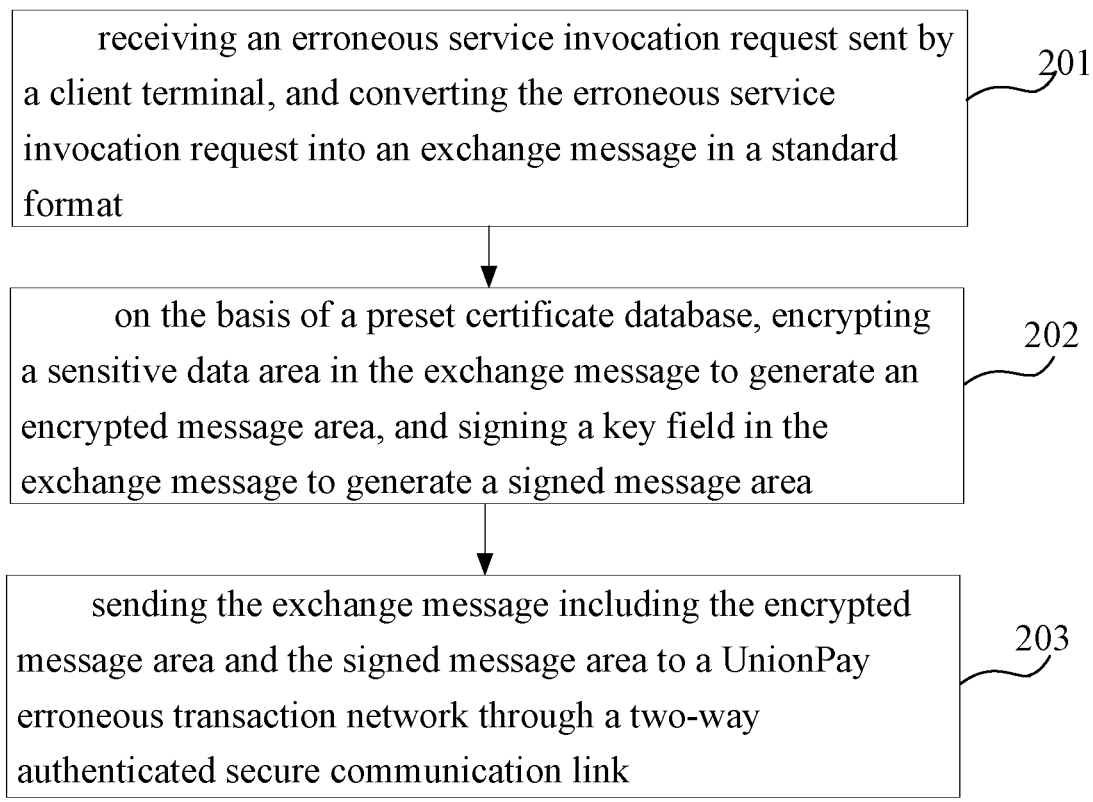
FIG. 2 is a flow diagram of a standardisation method for an erroneous transaction provided by an embodiment of the present invention.

An embodiment of the present invention provides a standardisation method for an erroneous transaction, as shown in FIG. 2 which is a flow diagram of the standardisation method for an erroneous transaction provided by the embodiment of the present invention, and the method includes the following operations 201 to 203.

Operation 201: an erroneous service invocation request sent by a client terminal is received, and the erroneous service invocation request is converted into an exchange message in a standard format.

The client terminal represents an erroneous transaction processing client platform of each UnionPay member institution. In order to adapt the erroneous transaction processing client platform of each UnionPay member institution, the request before conversion is a general program function invocation form, and a message element is input as a function invocation parameter. For example:

SetReqMsgHeader (getMsgHeader( ));
SetExpTransAt(TransAtr);
SetPriAccountNumber("6288888888888888");
SetSettleDt("20150101");
SetTransAmount(TransAtr);
SetTransKey("01033910 75376012151654200010300000");
SetTransLogCd("01");
SetRequestSeqNumber("123456789");

Specifically, the function of this operation is realized through the message conversion module 1021, and the standard format exchange message includes an XML (Extensible Markup Language) message tag name and an XML message tag value. After receiving an invocation, the message conversion module 1021 converts an invocation method name of the erroneous service invocation request into an XML message tag name according to a preset corresponding relationship between the invocation method name and a message tag; and then, according to invocation method parameters corresponding to the invocation method name of the erroneous service invocation request, the invocation method parameters of the erroneous service invocation request are converted into XML message tag values. The converted exchange message conforms to an XML message format of a UnionPay Erroneous Interfacing Networking United Specification and can be received and processed by the UnionPay erroneous transaction network according to the meaning of an erroneous service expressed in the exchange message. For example:

```
<data: SetRequestSeqNumber>123456789</data: SetRequestSeqNumber>
<data: PriAccountNumber>6288888888888888</data:
PriAccountNumber>
<data: SettleDt>20150101</data: SettleDt>
<data: TransAmount>10000</data: TransAmount>
<data: TransKey>01033910 7537601215165420001030000</data:
TransKey>
<data: TransLogCd>01</data: TransLogCd>
<data: ExpTransAt>10000</data: ExpTransAt>
```

Operation 202: on the basis of a preset certificate database, a sensitive data area in the exchange message is encrypted to generate an encrypted message area, and a key field in the exchange message is signed to generate a signed message area.

Specifically, in the standardisation system for erroneous transactions, the certificate database 1025 stores asymmetric encryption certificates issued by CFCA to UnionPay, the asymmetric encryption certificates include server public keys and client private keys in a development stage, a network access test stage and a production and operation stage. The certificate for access to the UnionPay erroneous transaction network is designated as an asymmetric encryption certificate of CFCA, and the types of keys contained in the certificate cannot be distinguished directly, such as the server public key and/or the client private key; and it is also impossible to distinguish the types of certificates, such as network access joint debugging test certificates and production certificates. This characteristic causes great difficulties in network access processes of institutions.

According to an embodiment of the present invention, the certificate database 1025 is managed through the certificate management module 1024, the asymmetric encryption certificate of the CFCA in a single standard format in the certificate database is configured, read and converted, and a server public key and a client private key in the asymmetric encryption certificate of the CFCA are extracted, and are converted into keys with a readable invocation form. The extracted server public key and client private key are used for providing a certificate for various functional modules such as signature, encryption and secure communication. For example, the source format of a client private key certificate is pfx, the source format of a server public key certificate is crt, and destination formats after extraction and conversion are formats that can be invoked directly, such as keystore, encryption function, and signature function.

In addition, the certificate management module 1024 distinguishes between erroneous network access joint debugging test certificates and production certificates, thus avoiding confusion in the use of the certificates, ensuring the use of different types of certificates at different stages of access to the network, and greatly improving the manageability and use efficiency of the certificates.

Further, the software encryption machine 1022 invokes the server public key from the certificate management module 1024 to encrypt the sensitive data area of the erroneous service invocation request to generate the encrypted message area. The sensitive data area includes sensitive data such as passwords that need to be encrypted. The encrypted information can only be decrypted by a server private key of a UnionPay erroneous network, and even if the encrypted information is illegally intercepted, the true sensitive information in the message cannot be obtained, thus realizing the secure transmission of sensitive information.

Further, the signature module 1023 invokes the client private key from the certificate management module 1024 to sign the key field in the erroneous service invocation request to generate the signed message area. The key field include key information such as transaction card number, transaction time, and transaction amount. After the signed information is read by the UnionPay erroneous network, the signature is verified by a client public key, and the key information is processed only after the verification is passed and is determined to be legal, thus realizing the non-repudiation and tampering resistance of the key information.

Further, if the erroneous service invocation request includes a credential file in a binary coding form, the credential file is decoded; and the decoded credential file is encoded by an encoding mode (e.g., base64 encoding mode) of the UnionPay erroneous transaction network to realize the secure transmission of the file.

Operation 203: by means of a two-way authenticated secure communication link, the exchange message including the encrypted message area and the signed message area is sent to the UnionPay erroneous transaction network.

Specifically, the function of this operation is realized by the secure communication module 1027. The secure communication link is a secure communication link established between the client terminal of each UnionPay member institution and a server of the UnionPay erroneous transaction network. The secure communication module 1027 invokes the server public key and the client private key from the certificate management module 1024, and establishes a two-way authenticated Secure Sockets Layer (SSL) mechanism with the server of the UnionPay erroneous transaction network according to Hyper Text Transfer Protocol over Secure Socket Layer (HTTPS). After the security authentication of both parties is passed, a message is sent to the server of the UnionPay erroneous transaction network, and a server response is received.

An embodiment of the present invention provides a standardisation method for erroneous transactions, including: converting an erroneous service invocation request sent by a client platform of a UnionPay member institution into a standard format exchange message, encrypting a sensitive data area through a software encryption machine, signing a key field through a signature module, encoding a credential file through a credential file encoding and decoding module, and converting the erroneous service invocation request into a message which can be processed by the UnionPay erroneous transaction network and conforms to a technical specification of the UnionPay erroneous transaction network. In addition, the standardisation method realizes the functions of each module through a Java universal interface technology, flexibly adapts the client system of each member institution accessing the UnionPay erroneous transaction network, provides a universal, safe and convenient client terminal access interface, shortens the development cycle of the member institution, reduces the error probability of the member institution at testing and commissioning stages, and greatly reduces the cost of the institution accessing the UnionPay erroneous transaction network.

Figure 3:
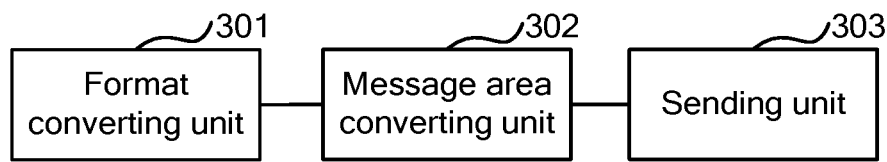
FIG. 3 is a structure diagram of a standardisation apparatus for an erroneous transaction provided by an embodiment of the present invention.

Based on the same inventive concept, an embodiment of the present invention also provides a standardisation apparatus for an erroneous transaction, as shown in FIG. 3 which is a structure diagram of the standardisation apparatus for an erroneous transaction provided by the embodiment of the present invention, and the apparatus includes a format converting unit 301, a message area converting unit 302, and a sending unit 303.

The format converting unit 301 is configured for receiving an erroneous service invocation request sent by a client terminal, and converting the erroneous service invocation request into an exchange message in a standard format;

The message area converting unit 302 is configured for, on the basis of a preset certificate database, encrypting a sensitive data area in the exchange message to generate an encrypted message area, and signing a key field in the exchange message to generate a signed message area;

The sending unit 303 is configured for, by means of a two-way authenticated secure communication link, sending the exchange message including the encrypted message area and the signed message area to a UnionPay erroneous transaction network.

Preferably, the exchange message in the standard format includes an extensible markup language XML message tag name and an XML message tag value.

The format converting unit 301 is specifically used for converting an invocation method name of the erroneous service invocation request into an XML message tag name according to a preset corresponding relationship between the invocation method name and a message tag;

The format converting unit is further configured for converting an invocation method parameter of the erroneous service invocation request into an XML message tag value.

Preferably, the preset certificate database is determined by: extracting a server public key and a client private key in an asymmetric encryption certificate of China Financial Certificate Authority (CFCA), and determining the preset certificate database by means of the server public key and the client private key, the asymmetric encryption certificate of the CFCA being used to access the UnionPay erroneous transaction network.

Preferably, the message area converting unit 302 is specifically used for: invoking the server public key in the preset certificate database to encrypt the sensitive data area of the erroneous service invocation request to generate the encrypted message area.

Preferably, the message area converting unit 302 is specifically used for: invoking the client private key in the preset certificate database to sign the key field in the erroneous service invocation request to generate the signed message area.

Preferably, the two-way authenticated secure communication link is determined by:
  invoking the server public key and the client private key in the preset certificate database, and establishing the two-way authenticated secure communication link with the UnionPay erroneous transaction network according to hyper text transfer protocol over secure socket layer (HTTPS).

Preferably, the message area converting unit 302 is further used for:
  if the erroneous service invocation request includes a credential file in a binary encoding form, decoding the credential file; and
  encoding the decoded credential file by means of an encoding mode of the UnionPay erroneous transaction network.

Specifically, the function of the format converting unit 301 in the embodiment of the present invention can be realized by the message conversion module 1021 in the erroneous transaction standardisation assembly 102 in the standardisation system for erroneous transactions provided in the embodiment of the present invention. The function of the message area converting unit 302 can be realized by the software encryption machine 1022, the signature module 1023, the certificate management module 1024, the certificate database 1025, and the credential file encoding and decoding module 1026 in the erroneous transaction standardisation assembly 102 in the standardisation system for erroneous transactions provided by the embodiment of the present invention. The function of the sending unit 303 can be realized by the certificate management module 1024, the certificate database 1025, and the secure communication module 1027 in the erroneous transaction standardisation assembly 102 in the standardisation system for erroneous transactions provided by the embodiment of the present invention.

The embodiment of the present invention provides a standardisation apparatus for erroneous transactions, including: converting an erroneous service invocation request sent by a client platform inside a UnionPay member institution into a standard format exchange message, encrypting sensitive data areas through a software encryption machine, signing key fields through a signature module, encoding a credential file through a credential file encoding and decoding module, and converting the erroneous service invocation request into a message which can be processed by the UnionPay erroneous transaction network and conforms to a technical specification of the UnionPay erroneous transaction network. In addition, the standardisation apparatus realizes the functions of each module through a Java universal interface technology, flexibly adapts the client system of each member institution accessing the UnionPay erroneous transaction network, provides a universal, safe and convenient client terminal access interface, shortens the development cycle of the member institution, reduces the error probability of the member institution at testing and commissioning stages, and greatly reduces the cost of the institution accessing the UnionPay erroneous transaction network.

Figure 4:
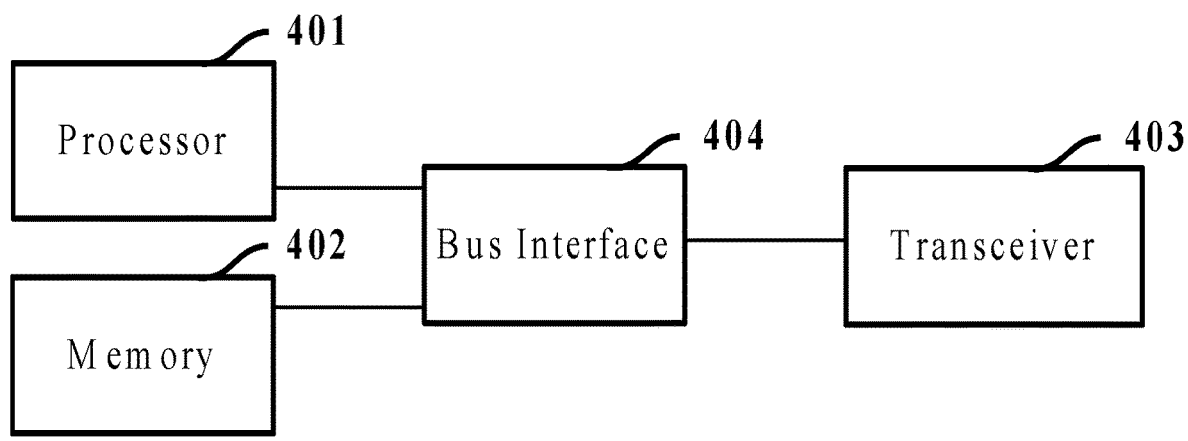
FIG. 4 is a structure diagram of an electronic device provided by an embodiment of the present invention.

Based on the same principle, the present invention also provides an electronic device, as shown in FIG. 4, including a processor 401, a memory 402, a transceiver 403 and a bus interface 404. The processor 401, the memory 402 and the transceiver 403 are connected with one another through the bus interface 404.

The transceiver 403 is configured for receiving an erroneous service invocation request sent by a client terminal.

The processor 401 is configured for: converting the erroneous service invocation request into an exchange message in a standard format; on the basis of a preset certificate database, encrypting sensitive data area(s) in the exchange message to generate encrypted message area(s), and signing key field(s) in the exchange message to generate signed message area(s); and, by means of a two-way authenticated secure communication link, sending an exchange message including the encrypted message area(s) and the signed message area(s) to a UnionPay erroneous transaction network.

The memory 402 is configured for storing one or more executable programs and can store data used by the processor during executing operations.

The bus interface 404 is configured for providing interfaces.

Further, the exchange message in the standard format includes an extensible markup language XML message tag name and an XML message tag value, and the processor 401 converting the erroneous service invocation request into the exchange message in the standard format is configured for:

converting an invocation method name of the erroneous service invocation request into the XML message tag name according to a preset corresponding relationship between an invocation method name and a message tag; and converting an invocation method parameter of the erroneous service invocation request into the XML message tag value.

Further, the preset certificate database is determined by: extracting a server public key and a client private key in an asymmetric encryption certificate of China Financial Certificate Authority (CFCA), and determining the preset certificate database by means of the server public key and the client private key, the asymmetric encryption certificate of the CFCA is used to access the UnionPay erroneous transaction network.

Further, the processor 401 encrypting the sensitive data area(s) of the erroneous service invocation request according to the preset certificate database to generate encrypted message area(s) is specifically configured for: invoking the server public key in the preset certificate database to encrypt the sensitive data area(s) of the erroneous service invocation request to generate the encrypted message area(s).

Further, the key field(s) in the erroneous service invocation request are signed, and the processor 401 generating signed message area(s) is specifically configured for: invoking the client private key in the preset certificate database to sign the key field(s) in the erroneous service invocation request so as to generate the signed message area(s).

Further, the two-way authenticated secure communication link is determined by:

establishing the two-way authenticated secure communication link with the UnionPay erroneous transaction network according to hyper text transfer protocol over secure socket layer (HTTPS) by invoking the server public key and the client private key in the preset certificate database.

Further, before sending the exchange message including the encrypted message area(s) and the signed message area(s) to the UnionPay erroneous transaction network by means of the secure communication link, the processor 401 is further configured for:

if the erroneous service invocation request includes a credential file in a binary encoding form, decoding the credential file; and encoding the decoded credential file by means of an encoding mode of the UnionPay erroneous transaction network.

An embodiment of the present invention provides a non-transitory computer readable storage medium that stores computer instructions for enabling a computer to execute any one of the standardisation methods for an erroneous transaction.

An embodiment of the present invention provides a computer program product including computer programs stored on the non-transitory computer readable storage medium, and the computer programs includes program instructions that, when executed by a computer, enable the computer to execute any one of the above standardisation methods for an erroneous transaction.

Those skilled in the art should understand that the embodiments of the present invention may provide a method, a system, or a computer program product. Therefore, the present invention may take the form of an entirely hardware embodiment, an entirely software embodiment, or an embodiment combining software and hardware aspects. Moreover, the present invention may take the form of a computer program product implemented on one or more computer usable storage media (including, but not limited to, a magnetic disk memory, a CD-ROM, an optical memory, etc.) containing computer usable program code.

The present invention is described with reference to a flow diagram and/or block diagram of a method, an apparatus (system), and a computer program product according to embodiments of the present invention. It should be understood that each flow and/or block in the flow diagram and/or block diagram, and combinations of flows and/or blocks in the flow diagram and/or block diagram, may be implemented by computer program instructions. These computer program instructions may be supplied to a processor of a general purpose computer, a special purpose computer, an embedded processing machine, or other programmable data processing apparatus to ensure that the instructions executed by the processor of the computer or other programmable data processing apparatus may implement the functions specified in one or more flows of the flow diagram and/or in one or more blocks of the block diagram.

These computer program instructions may also be stored in a computer readable memory that can direct a computer or other programmable data processing apparatus to function in a particular manner to ensure that the instructions stored in the computer readable memory produce an article of manufacture including an instruction device that implements the functions specified in one or more flows of the flow diagram and/or in one or more blocks of the block diagram.

These computer program instructions may also be loaded onto a computer or other programmable data processing apparatus to ensure that a series of operational steps are executed on the computer or other programmable apparatus to produce computer implemented processing, so that the instructions executed on the computer or other programmable apparatus provide steps for implementing the functions specified in one or more flows of the flow diagram and/or in one or more blocks of the block diagram.

Although the preferred embodiments of the present invention have been described, those skilled in the art may make additional alterations and modifications to these embodiments once they have learned the basic inventive concept. Therefore, the appended claims are intended to be interpreted as including the preferred embodiments and all alterations and modifications that fall within the scope of the present invention.

It will be apparent to those skilled in the art that various alterations and variations can be made to the present invention without departing from the spirit and scope of the present invention. Thus, if these modifications and variations of the present invention are within the scope of the claims of the present invention and their equivalents, the present invention is also intended to include these modifications and variations.

The invention claimed is:

1. A standardisation method for an erroneous transaction processed using an erroneous transaction standardization assembly, wherein the erroneous transaction standardization assembly has a unified interface for interfacing client terminals of UnionPay member institutions in various operating systems with a UnionPay erroneous transaction network, wherein the method comprises:
   determining, by a client terminal of a UnionPay member institution, an erroneous transaction to be processed by the UnionPay erroneous transaction network, which is a bank card erroneous service processing network of UnionPay member institutions;
   receiving, by the erroneous transaction standardization assembly, an erroneous service invocation request corresponding to the erroneous transaction and sent by the client terminal via a Java universal interface which is operatable in various operating systems when the client terminal has any erroneous transaction that needs to be processed by the UnionPay erroneous transaction network, wherein specific information of the UnionPay member institution is implemented as configuration parameters of the universal interface and includes at least a UnionPay institution code, user authority, and file path;
   converting, by the erroneous transaction standardization assembly, the erroneous service invocation request into an exchange message in a readable invocation form to adapt the UnionPay erroneous transaction network, wherein the erroneous service invocation request is a general program function invocation form, and a message element is input as a function invocation parameter;
   on the basis of a preset certificate database, encrypting, by the erroneous transaction standardization assembly, a sensitive data area in the exchange message to generate an encrypted message area, and signing, by the erroneous transaction standardization assembly, a key field in the exchange message to generate a signed message area; and
   sending, by the erroneous transaction standardization assembly, the exchange message comprising the encrypted message area and the signed message area to the UnionPay erroneous transaction network through a two-way authenticated secure communication link, to enable the UnionPay erroneous transaction network to process according to a meaning of an erroneous service expressed in the exchange message;
   wherein before sending the exchange message comprising the encrypted message area and the signed message area to the UnionPay erroneous transaction network through the secure communication link, the method further comprises:
   when the erroneous service invocation request comprises a credential file in a binary encoding form, decoding the credential file; and
   encoding the decoded credential file by means of an encoding mode of the UnionPay erroneous transaction network.

2. The method of claim 1, wherein the exchange message in the readable invocation format comprises an Extensible Markup Language (XML) message tag name and an XML message tag value, and the converting the erroneous service invocation request into the exchange message in the readable invocation format comprises:
   converting an invocation method name of the erroneous service invocation request into the XML message tag name according to a preset corresponding relationship between an invocation method name and a message tag; and
   converting an invocation method parameter of the erroneous service invocation request into the XML message tag value.

3. The method of claim 1, wherein the preset certificate database is determined by:
   extracting a server public key and a client private key in an asymmetric encryption certificate of China Financial Certificate Authority (CFCA), and determining the preset certificate database by means of the server public key and the client private key, the asymmetric encryption certificate of CFCA being used to access the UnionPay erroneous transaction network.

4. The method of claim 3, wherein the encrypting the sensitive data area in the exchange message to generate the encrypted message area, on the basis of the preset certificate database comprises:
   invoking the server public key in the preset certificate database to encrypt the sensitive data area in the exchange message to generate the encrypted message area.

5. The method of claim 3, wherein the signing the key field in the exchange message to generate the signed message area comprises:
   invoking the client private key in the preset certificate database to sign the key field in the exchange message to generate the signed message area.

6. The method of claim 3, wherein the two-way authenticated secure communication link is determined by:
   invoking the server public key and the client private key in the preset certificate database to establish the two-way authenticated secure communication link with the UnionPay erroneous transaction network according to Hyper Text Transfer Protocol over secure socket layer (HTTPS).

7. An electronic device, comprising a processor, a memory, a transceiver and a bus interface, wherein the processor, the memory and the transceiver are connected with one another through the bus interface;
   the processor is configured for determining an erroneous transaction to be processed by the UnionPay erroneous transaction network, which is a bank card erroneous service processing network of UnionPay member institutions;
   the transceiver is configured for receiving an erroneous service invocation request corresponding to the erroneous transaction via a Java universal interface which is operatable in various operating systems when the client terminal has any erroneous transaction that needs to be processed by the UnionPay erroneous transaction network, wherein specific information of the UnionPay member institution is implemented as configuration parameters of the universal interface and includes at least a UnionPay institution code, user authority, and file path;
   the processor is further configured for:
   converting the erroneous service invocation request into an exchange message in a readable invocation form to adapt the UnionPay erroneous transaction network, wherein the erroneous service invocation request is a general program function invocation form, and a message element is input as a function invocation parameter;
   on the basis of a preset certificate database, encrypting a sensitive data area in the exchange message to generate an encrypted message area; and signing a key field in the exchange message to generate a signed message area; and sending the exchange message including the encrypted message area and the signed message area to the UnionPay erroneous transaction network through a two-way authenticated secure communication link, to enable the UnionPay erroneous transaction network to process according to a meaning of an erroneous service expressed in the exchange message;

the memory is configured for storing one or more executable programs and data used by the processor during executing operations; and the bus interface is used for providing interfaces;

wherein the electronic device is a unified interface for interfacing the client terminals in the various operating systems with the UnionPay erroneous transaction network;

wherein the electronic device is suitable for the various operating systems and various middleware products through a Java universal interface technology;

wherein before sending the exchange message comprising the encrypted message area and the signed message area to the UnionPay erroneous transaction network through the secure communication link, the processor is further configured for:

when the erroneous service invocation request comprises a credential file in a binary encoding form, decoding the credential file; and encoding the decoded credential file by means of an encoding mode of the UnionPay erroneous transaction network.

8. The device of claim 7, wherein the exchange message in the readable invocation format comprises an Extensible Markup Language (XML) message tag name and an XML message tag value, and the processor converting the erroneous service invocation request into the exchange message in the readable invocation format is configured for:

converting an invocation method name of the erroneous service invocation request into the XML message tag name according to a preset corresponding relationship between an invocation method name and a message tag; and converting an invocation method parameter of the erroneous service invocation request into the XML message tag value.

9. The device of claim 7, wherein the preset certificate database is determined by:

extracting a server public key and a client private key in an asymmetric encryption certificate of China Financial Certificate Authority (CFCA), and determining the preset certificate database by means of the server public key and the client private key, the asymmetric encryption certificate of CFCA being used to access the UnionPay erroneous transaction network.

10. The device of claim 9, wherein the processor encrypting the sensitive data area in the exchange message to generate the encrypted message area, on the basis of the preset certificate database is configured for:

invoking the server public key in the preset certificate database to encrypt the sensitive data area in the exchange message to generate the encrypted message area.

11. The device of claim 9, wherein the processor signing the key field in the exchange message to generate the signed message area is configured for:

invoking the client private key in the preset certificate database to sign the key field in the exchange message to generate the signed message area.

12. The device of claim 9, wherein the two-way authenticated secure communication link is determined by:

invoking the server public key and the client private key in the preset certificate database to establish the two-way authenticated secure communication link with the UnionPay erroneous transaction network according to Hyper Text Transfer Protocol over secure socket layer (HTTPS).

13. A non-transitory computer readable storage medium, storing computer instructions, wherein the computer instructions enable a computer to execute the method of claim 1.

14. A computer program product, comprising computer programs stored in a non-transitory computer readable storage medium, and the computer programs comprising program instructions, wherein when the program instructions are executed by a computer, the computer is enabled to execute the method of claim 1.

15. The method of claim 2, wherein before sending the exchange message comprising the encrypted message area and the signed message area to the UnionPay erroneous transaction network through the secure communication link, the method further comprises:

when the erroneous service invocation request comprises a credential file in a binary encoding form, decoding the credential file; and encoding the decoded credential file by means of an encoding mode of the UnionPay erroneous transaction network.

16. The method of claim 3, wherein before sending the exchange message comprising the encrypted message area and the signed message area to the UnionPay erroneous transaction network through the secure communication link, the method further comprises:

when the erroneous service invocation request comprises a credential file in a binary encoding form, decoding the credential file; and encoding the decoded credential file by means of an encoding mode of the UnionPay erroneous transaction network.

17. The device of claim 8, wherein before sending the exchange message comprising the encrypted message area and the signed message area to the UnionPay erroneous transaction network through the secure communication link, the processor is further configured for:

when the erroneous service invocation request comprises a credential file in a binary encoding form, decoding the credential file; and encoding the decoded credential file by means of an encoding mode of the UnionPay erroneous transaction network.

18. The device of claim 9, wherein before sending the exchange message comprising the encrypted message area and the signed message area to the UnionPay erroneous transaction network through the secure communication link, the processor is further configured for:

when the erroneous service invocation request comprises a credential file in a binary encoding form, decoding the credential file; and encoding the decoded credential file by means of an encoding mode of the UnionPay erroneous transaction network.

* * * * *